United States Patent [19]

Crowther et al.

[11] Patent Number: 5,082,235
[45] Date of Patent: Jan. 21, 1992

[54] DISPLAY MOUNTED DOCUMENT HOLDER

[75] Inventors: Dale A. Crowther, Burley, Id.;
William R. Isham, 9138 N. 6800 W.,
American Fork, Utah 84003

[73] Assignee: William R. Isham, American Fork, Utah

[21] Appl. No.: 359,026

[22] Filed: May 30, 1989

[51] Int. Cl.⁵ .............................................. B41J 11/00
[52] U.S. Cl. .................. 248/918; 248/442.2; 248/278; 248/231.4; 248/447.2
[58] Field of Search .................. 248/918, 442.2, 316.4, 248/452, 279, 278, 231.4, 447.2; 312/7.2

[56] References Cited
U.S. PATENT DOCUMENTS

3,939,986  2/1976  Pierro ........................... 248/231.4 X
4,141,524  2/1979  Corvese, Jr. ................... 248/231.4 X Primary Examiner—Alvin C. Chin-Shue
Attorney, Agent, or Firm—Workman Nydegger & Jensen

[57] ABSTRACT

An improved apparatus for holding documents and other articles for viewing by a person using a computer display is disclosed. The described embodiments include an attaching structure, such as a clamp which grips the exterior housing of the display. Other embodiments of the invention may include structures which only rest upon the exterior housing of the display. A document platen adapted for holding documents is secured to the attached structure so that the document platen is held above the work surface transversely adjacent to the display. Some embodiments of the invention may also include structures which allow documents to be held on the left, right, or both sides of the display. Further embodiments of the invention may include structures allowing the apparatus to be used with displays of varying size as well as structures to adjust the position and orientation of the document being held by the apparatus.

33 Claims, 7 Drawing Sheets

DISPLAY MOUNTED DOCUMENT HOLDER

BACKGROUND

1. The Field of the Invention.

This invention relates to apparatus for positioning documents in an orientation where they may be conveniently viewed by an individual using a computer display, a keyboard, or computer terminal. More particularly, the present invention relates to apparatus for holding documents adjacent to a display in a position desired by a user viewing the display which is associated with a word processor, computer, or similar device.

2. The Background Art.

The recent proliferation of digital computers in modern society has greatly increased the availability of what has become known as "word processing" to large numbers of people. The widespread availability of digital computers has also benefited fields such as business, science, and industry. As the availability of digital computers has increased, so has the number of individuals who are at least somewhat proficient at entering information on a conventional "QWERTY" keyboard. Moreover, modern word processing and desktop publishing techniques have greatly increased the productivity of even experienced typists.

Both beginning and experienced typists generally have occasions where information contained in a document must be manually entered on a keyboard. Moreover, as the applications of computers has expanded, users such as engineering, medical, financial, and business professionals often must view documents or three-dimensional articles while working at a display Many such users of displays have heretofore been without a suitable apparatus for holding various papers, books, and other articles while using a display. As used herein, the term "document" is intended to include planar sheets of paper such as handwritten notes, bound sheets of paper such as a book or periodical, bulky three-dimensional objects, or other materials which are visually perceived.

In the case of a typist inputting information on a keyboard, proper typing technique requires that the typist maintain visual contact with the original document, and not with the keyboard or the typist's fingers. In order to facilitate the task of the typist, various devices often referred to as copyholders were introduced.

Copyholders in the past have generally been devices which include a base, often weighted, which are adapted for resting on the work surface (e.o., a table top or counter top) next to a typewriter. Copyholders also have generally included a flat copyboard which supports the original document and a vertical pole which holds the copyboard above the work surface. In this way the original document was held in a position which allowed the typist to more easily view the document and to change visual focus from the typed page to the original document if necessary. While previously available copyholders are an improvement over placing original documents directly on a work surface, their use entails several drawbacks and disadvantages.

Among the disadvantages of many previously available copyholders is the fact that the base of a copyholder occupies space on a work surface, even when not being used, which might be devoted to other items. Moreover, with nearly all displays used with computer systems and word processors, the display is supported a substantial distance above the work surface. Conventional copyholders, however, are designed to hold the original document near the level of a typewriter, i.e., much lower than the level of a display. Thus, the fatigue, and the number of errors, experienced by a typist may be increased by the extra eye movement and refocusing required when switching between the original document and the text on the display when using many previously available copyholders. This is particularly true when transcribing information contained on the bottom of the original document. Still further, merely increasing the height of the copyboard of a conventional copyholder increases the ungainliness of the device and the likelihood that it will be tipped over.

In still another example, a doctor, engineer, or technician may have a drawing, photograph, or print which is to be compared to images provided on the display. Furthermore, bookkeepers and accountants often must compare or enter numbers from a sheet of paper to a computer terminal. Heretofore, such users have not had an apparatus which would readily hold the original adjacent to the display to allow easy simultaneous side by side viewing of both the original document and the image on the display as the image was manipulated or changed.

In view of the foregoing, it would be an advance in the art to provide a document holder which is particularly adapted for use with computer system and word processor displays. It would also be an advance in the art to provide a document holder which holds various types of documents and articles at a position which is most efficient for a user viewing a terminal display. It would also be an advance in the art to provide a document holder which does not take up any work surface space and which may hold a variety of objects.

OBJECTS AND BRIEF SUMMARY OF THE INVENTION

In view of the present state of the art, it is a primary object of the present invention to provide an apparatus for holding original documents in a position where they may be efficiently viewed by a typist entering information at a computer terminal keyboard.

It is another object of the present invention to provide an apparatus for holding an article or a document in a position which may be conveniently viewed by a user while simultaneously viewing a display.

It is still another object of the present invention to provide an apparatus for holding any one of several different types of documents at a position transversely adjacent to a computer display where it can be most efficiently viewed by a terminal operator.

It is still another object of the present invention to provide an apparatus for holding documents, or bulky three-dimensional objects, adjacent to a computer display which does not occupy any work surface space.

It is a still further object of the present invention to provide an apparatus for holding a document in a position conveniently viewable by a typist using a computer display which may be easily adapted to hold a document on the left or the right of the display, or a document on each side of the display, and which may be readily interchanged from one display to another display without requiring any modifications to the displays.

Additional objects and advantages of the present invention will be apparent from the description and claims which follow, or may be learned by the practice of the invention.

Briefly summarized, the foregoing objects and advantages are realized in an improved apparatus for holding documents such as papers, books, and other articles while a user views both document and a display such as is associated with a digital computer. In each of the presently preferred embodiments described herein, the apparatus is attached by some structure to a display. Documents are placed on the apparatus which then holds the documents above the work surface in an optimum position for viewing by the user.

In some of the described embodiments, a clamping structure grips the exterior housing of the display. Other embodiments may include structures which only rest upon the exterior housing of the display. Also included in the embodiments of the invention is a structure adapted for holding various types of documents also referred to as a document platen. The document platen is held above the work surface transversely adjacent to the display.

Some embodiments of the invention may also include structures which allow documents to be held on the left, right, or both sides of the display. Further embodiments of the invention may include structures allowing the apparatus to be used with displays of varying size as well as structures to adjust the position and orientation of the document being held by the apparatus.

BRIEF DESCRIPTION OF THE DRAWINGS

4B is an elevated cross-sectional view of the first embodiment illustrated in FIG. 4A with the document platen positioned in a horizontal orientation and various articles placed thereon.

DETAILED DESCRIPTION OF THE PREFERRED EMBODIMENTS

As will be appreciated by consideration of the following description as well as the accompanying drawings, the inventive concepts of the present invention may be embodied in many different forms. The presently preferred embodiments described herein represent the presently preferred best known mode for carrying out the invention. Nevertheless, many 21 embodiments other than those specifically detailed herein may be used to carry out the inventive concepts described in the claims appended hereto.

In the accompanying drawings, like structures will be provided with like reference numerals. Moreover, it will be appreciated that those having skill in the art will be able to readily substitute other structures for carrying out the same or equivalent functions as those carried out by the illustrated structures specifically described herein in order to implement the various features of the present invention.

As described earlier, the use of computer displays has become more widespread in many aspects of modern society. Accompanying the increased use of computer displays, whether with dedicated word processing systems or other digital computer systems, little has been provided in the previously available art to conveniently hold documents and things in the proper position so that both the display and the documents may both be simultaneously viewed and reached by an individual using a display. Thus, the present invention provides an apparatus for holding documents in a proper position transversely adjacent to a computer display which provides advantages not heretofore available in the art. As used herein, the term "display" is intended to include any device now known or developed in the future which is used to communicate alpha-numeric or graphical information from a data processing device, such as a computer, to a user. Generally, the user will be a typist sitting in front of the display. However, the user may be an individual who is merely comparing an image on the display to an original document. Still further, other users may be carrying out different tasks. One example of a display currently used in the art is the conventional cathode ray tube (CRT) display illustrated in the accompanying drawings. Additionally, many other types of displays may benefit from the use of the present invention.

Often displays are self-contained in their own housings. The housings are generally elevated somewhat above the work surface upon which the keyboard of the computer rests. Such self contained displays are represented in FIGS. 1-8. Alternatively, many displays are contained in the same housing as other computer components as represented in FIGS. 9-12.

Figure 1:
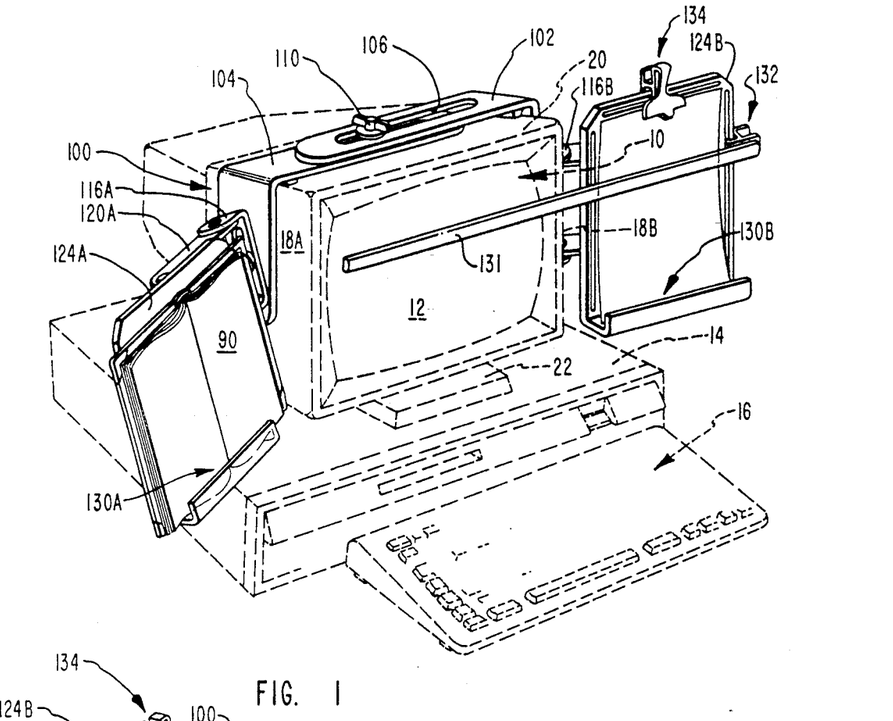
FIG. 1 is a perspective view of a first presently preferred embodiment of the present invention installed on a representative computer display.

A first presently preferred embodiment of the present invention, generally designated 100, is represented in the perspective view of FIG. 1. Represented in FIG. 1 is a computer display 10 with an associated computer CPU 14 and keyboard 16 all illustrated in phantom outline. It will be appreciated that the display 10, computer CPU 14, and keyboard 16 are merely representative of the many different equivalent structures with which the embodiments of the present invention may be used.

The display 10 includes a CRT, the face of which is shown at 12, and a housing. The housing includes substantially vertical sides 18A and 18B and a top 20. The display 10 includes a pedestal 22. As is common in the art, the pedestal 22 is adapted to allow the angle at which the display 10 is oriented to be varied in one or more planes (i.e., tilt and swivel). Moreover, the display 10 may also be set upon a 28 shelf elevated above the work surface or placed directly upon a work surface such as a table top.

Display 10, being a CRT type of display, is also commonly referred to in the art as a "monitor." Furthermore, the combination of a keyboard, display, and computer CPU is often referred to as a "terminal" when part of a larger computer system. All of the above are capable of benefitting from the use of the present invention.

According to the broad inventive concepts of the present invention, some embodiments of the present invention may include an attaching means for compressively gripping a computer display such that the positional relationship between said attaching means and the display remains fixed when force is applied to the attaching means.

As one example, and not by way of limitation, of an attaching means which may be used with the present invention, the first presently preferred embodiment includes a left attachment leg 102 and a right attachment leg 104. The structure of the left and right attachment legs can be seen best in the forward and reverse perspective views of FIGS. 1 and 2, respectively, and the cross-sectional view of FIG. 3. The structure formed by the left and right attachment legs may be referred to as a clamp as may other structures performing equivalent functions. Furthermore, since the left and right attachment legs grip the surface of the display, these structures may also be referred to as gripping members.

Figure 2:
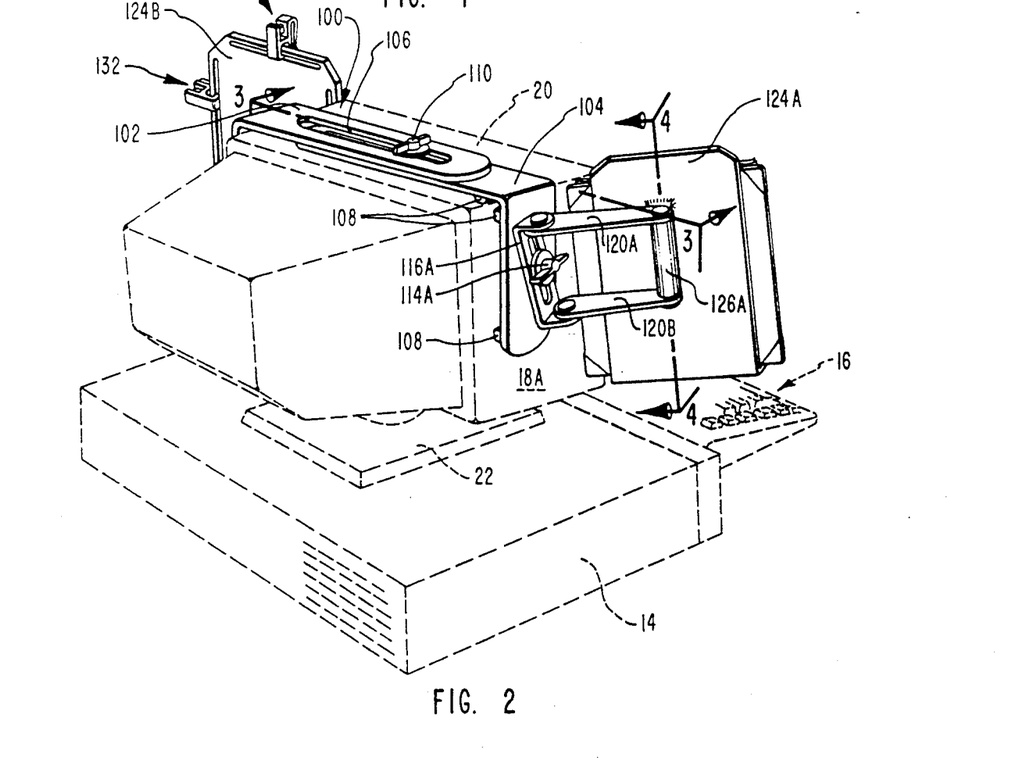
FIG. 2 is a reverse perspective view of the first presently preferred embodiment installed on a representative computer display.
Figure 3:
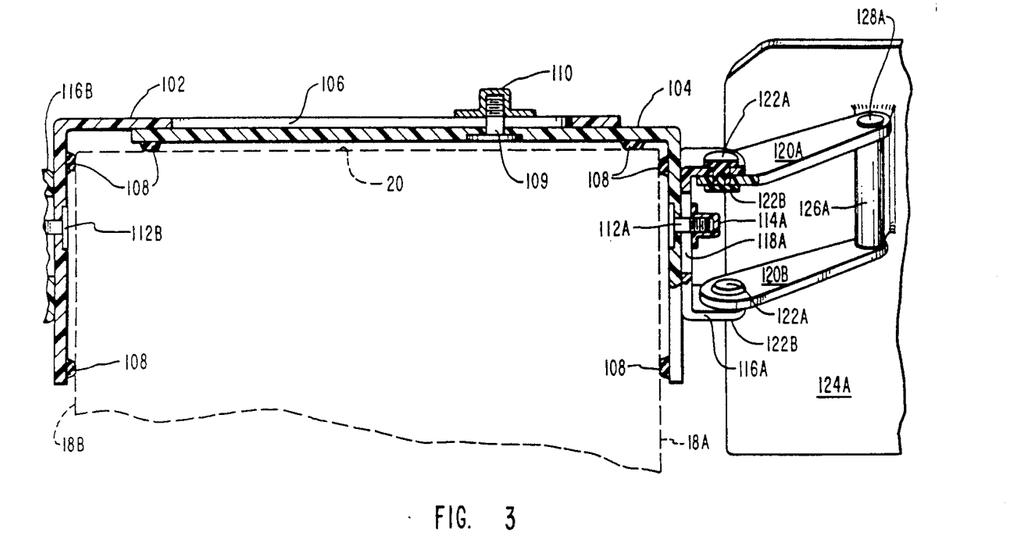
FIG. 3 is an elevated cross-sectional view of the first embodiment taken along line 3—3 of FIG. 2.

As shown in FIGS. 1-3, the left attachment leg 102 and the right attachment leg 104 comprise members having a generally L-shaped configuration. On the inside surface of each of the attachment legs 102 and 104 are cushions 108, spaced apart as shown best in FIGS. 2 and 3. In the presently preferred embodiment, the cushions 108 comprise ridges of resilient material. When the legs 102 and 104 are applied to the display 10, the cushions 108 are slightly compressed and thus frictionally engage the housing of display 10 on both vertical sides 18A and 18B and at the top 20.

The left attachment leg and right attachment leg, 102 and 104 respectively, may be fabricated from one of many different materials known to those skilled in the art. For example, attachment legs 102 and 104 may be fabricated from a suitable plastic material as may many other structures represented in the drawings. Alternatively, materials such as metal and wood may be used to fabricate attachment legs 102 and 104 as well as the other structures of the embodiments represented herein.

In the first presently preferred embodiment, the attachment means further comprises a wing nut 110 which is shown in cross-section in FIG. 3. Wing nut 110, and its associated bolt 109, function to adjustably lock the left attachment leg 102 and the right attachment leg 104 in a fixed positional relationship. As can be seen in FIGS. 1 and 2, the left attachment leg 102 is provided with a longitudinal slot 106 provided on the upward facing surface thereof.

As shown best in the cross-sectional view of FIG. 3, the bolt 109 is embedded into right attachment leg 104 and the shaft of the bolt 109 extends up through the slot 106 provided in the left attachment leg 102. Thus, as the wing nut 110 is tightened onto bolt 109, the adjoining surfaces of the left attachment leg 102 and the right attachment leg 104 are pressed together to create a friction lock. In this way, the distance between the vertical portions of the attachment legs is fixed. The wing nut 110 is preferably sufficiently large, and properly shaped, such that a user may adequately finger tighten the wing nut 110 to create a friction lock.

The just described bolt 109, wing nut 110, and slot 106 arrangement is just one example of how a locking means of the present invention may be carried out. Moreover, it will be appreciated that the attaching means of the present invention may be adapted to attach to portions of the display housing other than those explicitly represented in the figures.

According to the broad inventive concepts of the present invention, a holding means for holding a document in a configuration to allow viewing of the document by a user sitting at the display is provided in the embodiments. By way of example and not limitation, copy platens 124A and 124B in FIGS. 1 and 2 function as a holding means.

Figure 4A:
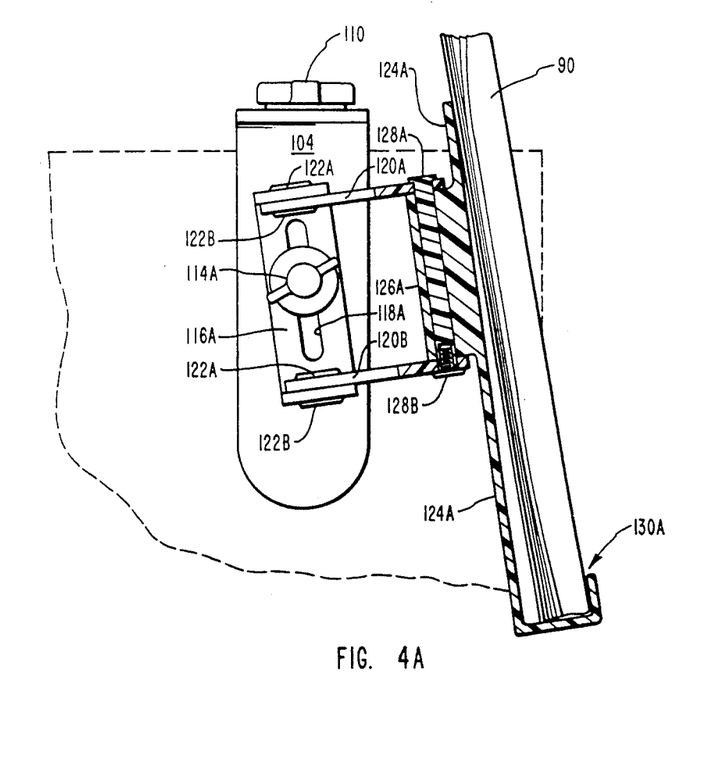
FIG. 4A is an elevated cross-sectional view of the first embodiment taken along line 4—4 of FIG. 2.

As can be seen best in FIGS. 1, 2, and the cross-sectional view of FIG. 4A, copy platens 124A and 124B are each a generally planar structure provided with a trough (generally designated 130A in FIG. 4A) at their bottoms. The troughs 130A and 130B provides a shelf upon which documents such as a book, represented at 90 in FIGS. 1 and 4A, may rest. As can be seen in FIGS. 1 and 3, providing troughs 130A and 130B on the document platens 124A and 124B facilitates holding documents such as the book 90 in an open position at the selected page.

As will be appreciated by those skilled in the art, and as will be further illustrated in other embodiments of the present invention described herein, the holding means of the present invention may comprise structures other than those specifically described herein but performing similar or equivalent functions. For example, the holding means may include only one copy platen 124A or 124B which may be disposed on either the left or the right of display.

In keeping with the broad inventive concepts of the present invention, a securing means for securing the holding means to the attaching means may also be included in the presently preferred embodiments of the present invention. The securing means secures the holding means to the attaching means such that the holding means is positioned transversely adjacent to the display in a position viewable by a user of the display. Generally, the user of the display will be a typist sitting at the keyboard 16. However, a user may also be an individual viewing a display and carrying out tasks using a mouse or some other input device or perhaps even verbal commands. Still further a user may be merely viewing both an original document and the display without entering any information of the keyboard 16.

As shown best in FIG. 2, a U-bracket 116A, upper and lower extension arms 120A and 120B, and a document platen cylinder 126A, and their associated structures, function as one presently preferred example of a securing means in the first presently preferred embodiment. Other structures performing equivalent functions, however, may also comprise a securing means. The structure of these components can be seen best in the partial cross-sectional views of FIGS. 3 and 4A.

As shown best in FIG. 4A, the U-bracket 116A is provided with a slot 118A along its bottom portion. As shown best in the cross-sectional portion of FIG. 3, a bolt 112A is fixed in the right attachment leg 104 such that the shaft of the bolt 112A extends through to the outside surface of the attachment leg 104. The shaft of the bolt 112A is long enough so that it extends through a slot 118A provided in the U-bracket 116A and a wing nut 114A is secured on the bolt 112A. Thus, by properly tightening the wing nut 114A onto the bolt 112A, the position of the U-bracket 116A may be angularly adjusted as well as vertically adjusted within the length of the slot 118A.

As shown best in FIG. 3, the extension arms 120A and 120B are each provided with bores at one end which correspond to the bores provided in the ends of the U-bracket 116A. Nuts 122A and bolts 122B are inserted through the bores and tightened so that frictional engagement between each of the extension arms 120A and 120B and the U-bracket 116A occurs. Thus, the positional relationship between the extension arms 120A and 120B and the U-bracket 116A may be altered by overcoming the frictional engagement provided by nuts 122A and bolts 122B and, when the force is removed, the extension arms 120A and 120B will remain a fixed position until moved again.

As represented in FIGS. 3 and 4A, the extension arms 120A and 120B are provided with bores at a second end through which a nut 128A and a bolt 128B are inserted. The nut 128A and bolt 128B are also inserted through document platen cylinder 126A which is a hollow cylindrical structure formed on the back side of document platen 124A.

As shown best in the cross-sectional portion of FIG. 4, the document platen cylinder 126A may be formed of the same materials, and formed integral with, the document platen 124A. As will be appreciated by examining the structure represented in FIGS. 3 and 4A, when the bolt 128B and the nut 128A are properly tightened, the frictional engagement between the extension arms 120A and 120B and the document platen cylinder 126A is such that the document platen 124A is held in the position at which it was last set by a user.

Figure 4B:
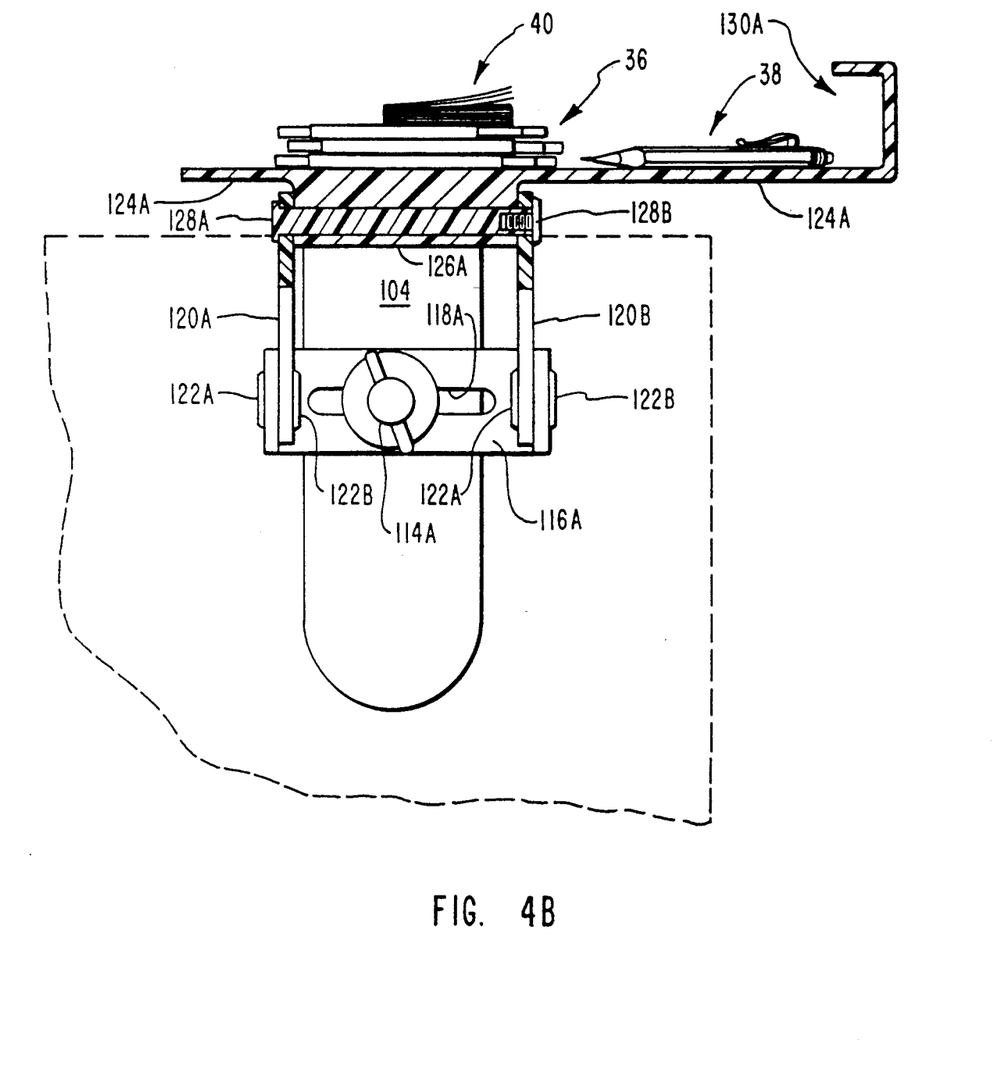

Referring now to FIG. 4B, the document platen 124A has been oriented to a horizontal position and is being used as a supplemental work surface to hold in a convenient location objects such as magnetic disks 36, a pencil 38, and a note pad 40. Alternatively, the document platen may be used to hold a model or other bulky article which is to be viewed by a user positioned at a display.

The structures associated with document platen 124B, and functioning as a securing means, may be identical to the just described structures associated with document platen 124A, such as U-bracket 116B and bolt 112B. As can be seen best in FIG. 1, the document platen 124B may be provided with a moveable copy marker, generally designated 132, and a copy clamp, generally designated 134. The long marker bar 131 provided on the copy marker 132 allows lines of text to be lined up on both the display and the original document. Since both the copy marker 134 and the document platen 124B may be moved vertically, the document and the information on the display may be easily lined up. Further details concerning a preferred structure for the copymarker 132 and the copy clamp 134 will be provided later in this disclosure.

As will be appreciated by examining FIGS. 1–4B, the first presently preferred embodiment provides many advantages over devices previously available in the art. As will now be understood, the first presently preferred embodiment 100, as well as other embodiments of the present invention described herein, may be readily adapted for use with displays having housings of various sizes and configurations. Moreover, the structure of the first described embodiment allows (1) the height of the document above the work surface to be altered, (2) the angle at which the document is held in relation to the work surface to be altered, (3) the angle at which the document is held in relationship to the plane of the display face (12 in FIG. 1) to be changed, and (4) the position of the document in front of, in back of, or even with the plane of the face of the display to be changed. This "four-way" adjustment of the position of the document above the work surface allows a user to precisely position a document to allow maximum efficiency while typing on a keyboard.

Furthermore, it will be appreciated that embodiments of the invention may be fabricated which require very little clearance to the sides of the display thus facilitating the placement of the display in an enclosure or on a shelf. Moreover, the first described embodiment is able to hold various types of documents, such as the book 90, without taking up any space on the work surface. With the descriptions of the structure of the first and other embodiments of the invention contained herein, those skilled in the art will readily understand the operation and use of the embodiments of the present invention.

Figure 5:
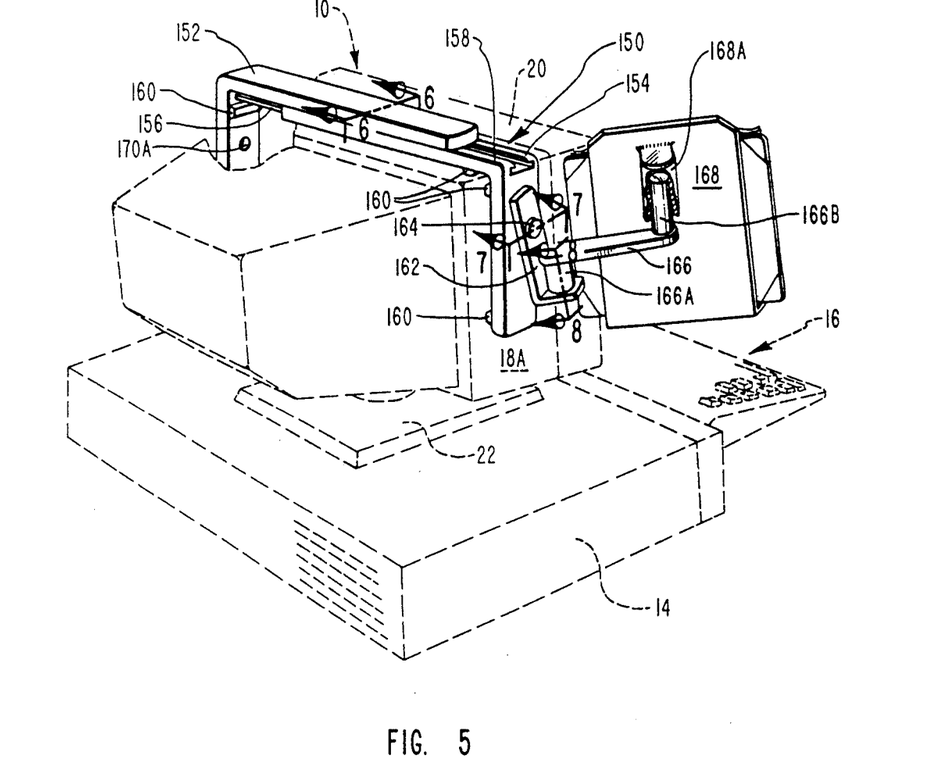
FIG. 5 is a perspective view of a second presently preferred embodiment of the present invention.

A second presently preferred embodiment of the present invention is represented in FIG. 5. In FIG. 5, the second presently preferred embodiment 150 is illustrated installed on a computer display having hardware components associated therewith as previously described and shown in phantom image.

As shown in FIG. 5, the second described embodiment includes a left attachment leg 152 and a right attachment leg 154. As in the previously described embodiment, the left and right attachment legs 152 and 154 are provided with cushions 160. The cushions 160 allow the attachment legs 152 and 154 to frictionally engage the vertical sides (one of which is shown at 18A) of the display 10, as well as its top surface 20.

Attachment legs 152 and 154 interengage one another by way of a slot and key arrangement. As shown best in the cross-sectional view of FIG. 6, the right attachment leg 154 is provided with a T-shaped slot along its top length represented at 158 in FIG. 6. Correspondingly, the left attachment leg 152 is provided with a correspondingly shaped T-shaped key represented at 156 in FIG. 6.

Figure 6:
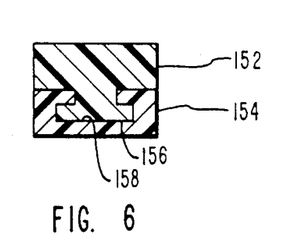
FIG. 6 is a cross-sectional view of the second embodiment taken along line 6—6 of FIG. 5.

The dimensions of the slot 158 and key 156 shown in FIG. 6 are such that very little space, if any visible space at all, is provided between the adjoining structures of the left attachment leg 152 and the right attachment leg 154 when the two are interengaged as shown in FIGS. 5 and 6. There is, however, enough space between the adjoining structures so that the left attachment leg 152 and the right attachment leg 154 may be slidably engaged by the user. When, however, one of the attachment legs 152 or 154 is slightly bent along its upper length, such as, for example, when the weight of document platen 168, and documents placed thereon, cause the right attachment leg 154 to bend slightly along its upper length, the frictional engagement therebetween causes sliding movement between the left attachment leg 152 and the right attachment leg 154 to be restrained. The bowing of the upper lengths of the attachment legs 152 and 154 also tends to press the vertical portions of the attachment legs into the sides of the display. Additionally, it is usually the case that placing the apparatus 150 on the housing of the display 10 will cause the interengaging portions of the attachment legs 152 and 154 to frictionally engage each other.

In the just described fashion, the distance between the vertical portions of the attachment legs may be easily adjusted by a user so as to be adaptable to different sizes of displays 10. Nevertheless, after installing the second embodiment 150 on the display, the attachment legs 152 and 154 are frictionally held in their relationship and frictionally engage the sides and top of the display 10.

Figure 7:
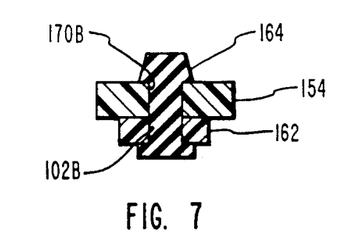
FIG. 7 is a cross-sectional view of the second embodiment taken along line 7—7 of FIG. 5.

Also represented in FIG. 5 is an L-bracket 162, an extension arm 166, and a document platen 168. The L-bracket 162 is held against the vertical portion of right attachment FIG. 7 provides a cross-sectional view of the resilient bolt 164 inserted into position through a bore 170B provided in the right attachment leg 154 and the bore 162B in the L-bracket 162. The resilient bolt 164 may be fabricated from many materials known in the art, such as many rubber-like materials, and should have dimensions which causes the L-bracket 162 to be pressed against the vertical portion of the right attachment leg 154 so that a frictional engagement therebetween is created. This frictional engagement allows a user to adjust the angular orientation of the L-bracket 162 without requiring the loosening and retightening of a nut.

The left attachment leg 152 is provided with a corresponding bore 170A which is configured to receive another resilient bolt 164 if the user desires to modify the embodiment 150 so that the document platen 168 is located on the left attachment arm 152 or if two document platens are desired. The illustrated arrangement used to secure the L-bracket 162 to the right attachment arm 154 allows the angular orientation of the L-bracket 162 to be varied according to the desires of the user.

Figure 8:
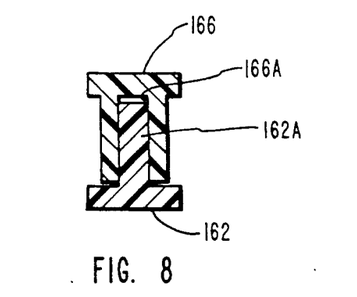
FIG. 8 is a cross-sectional view of the second embodiment taken along line 8—8 of FIG. 5.

The extension arm 166 is mounted on the L-bracket 162 by a post and recess structure represented in the cross-sectional view of FIG. 8. In FIG. 8, a post 162A is fabricated as an integral structure with the L-bracket 162 and is shown inserted into a recess 166A formed integrally with the extension arm 166. The post 162A and the recess 166A are formed such that the post 162A does not extend completely into recess 166A.

As will be understood by those skilled in the art, by properly selecting materials and surface texture treatment thereof from which to form the post 162A and the recess 166A, the frictional engagement therebetween can allow a user to select the proper angular orientation for extension arm 166 by applying force to the extension arm 166 until the desired position is reached. Alternatively, the user may lift the extension arm 166 to remove the post 162A from the recess 166A and reinsert the post 162A into the recess 166A at a new position It will be appreciated that alternative structures, for example, splines (not illustrated) provided on post 162A, may also be used to provide an angularly adjustable extension arm. Similarly, other embodiments described herein may incorporate structures which have textured surface treatments provided on their interengaging portions.

As described in connection with the first representative embodiment, the document platen 168 may be generally adapted for receiving books, sheets of paper, documents, and other articles. In the second described embodiment 150, document platen cylinder 168A is a closed cylinder which is formed integrally with document platen 168. The closed cylinder 168A receives a post 166B extending upwardly from the extension arm 166. Similarly to the post and recess arrangement represented in FIG. 8, the dimensions of the post 166B and the closed cylinder 168A are chosen such that the frictional engagement therebetween allows a user to position the document platen 168 in the desired angular orientation.

Figure 9:
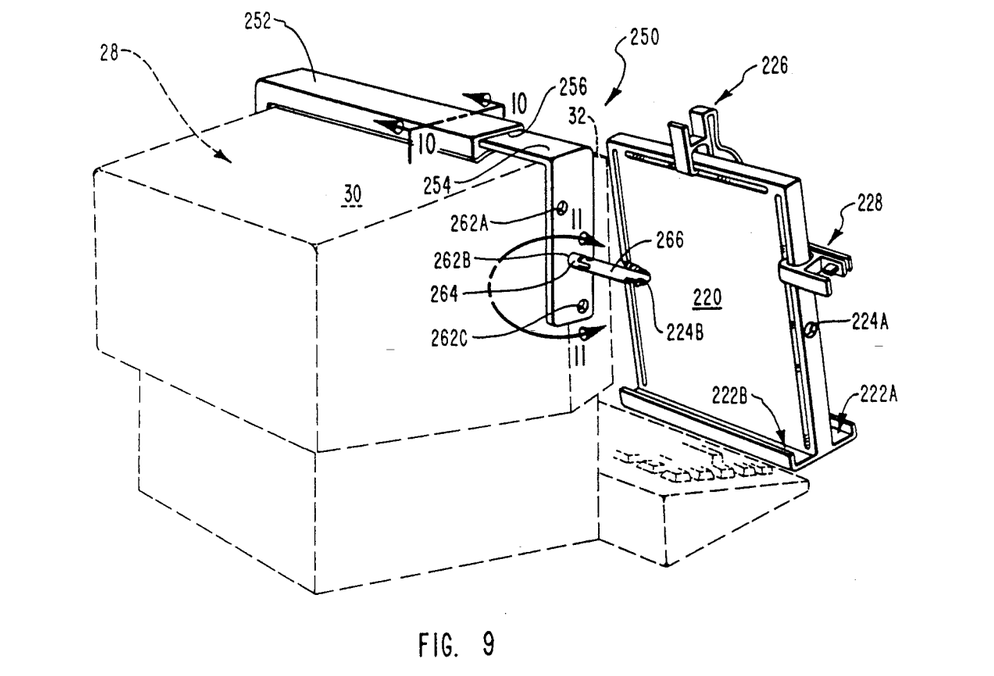
FIG. 9 is a is a reverse perspective view of a third presently preferred embodiment of the present invention.

A third presently preferred embodiment of the present invention is represented in the reverse perspective view of FIG. 9. The third presently preferred embodiment, generally designated 250, represented in FIG. 9 is illustrated as being installed upon a display, generally designated 28, which rests directly upon a work surface such as a counter top or a desk top.

As illustrated in FIG. 9, a left attachment leg 252 is provided with a rectangular recess 256 into which is received a right attachment leg 254. The left attachment leg 252 and the right attachment leg 254 are held in a spaced relationship by the frictional engagement between the right attachment leg 254 and a rectangular recess 256 in a manner similar to that described in connection with attachment legs 152 and 154 represented in FIG. 5. Thus, after the user has properly positioned the right attachment leg 254 and the left attachment leg 252, the frictional engagement therebetween holds the two structures in the proper spaced relationship.

Figure 10:
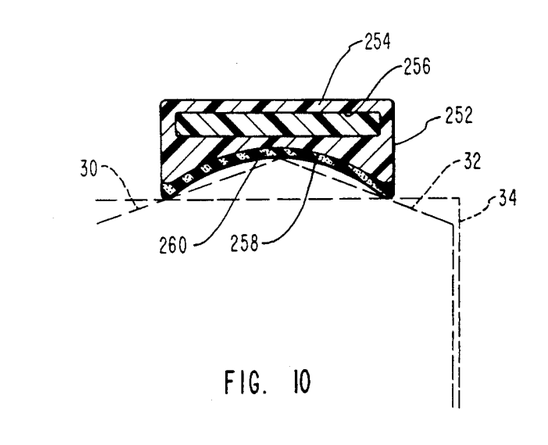
FIG. 10 is a cross-sectional view of the third embodiment taken along line 10—10 of FIG. 9.
Figure 11:
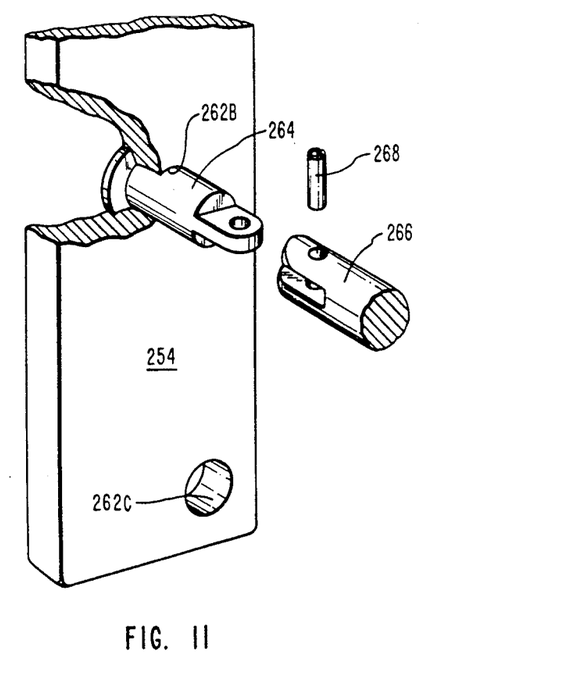
FIG. 11 is a partially cut away perspective view of the third embodiment taken along line 11—11 of FIG. 9.

The structure of the left attachment leg 252 can be seen best in the cross-sectional view of FIG. 10. In the cross-sectional view of FIG. 10 it can be seen that the left attachment leg 252 is provided with a curved lower surface 258 upon which is formed a cushion of some type of resilient material 260. The curved lower surface 258 and the cushion 260 allow the embodiment 250 to be used with displays having irregular top housing surfaces, as shown in FIGS. 9 and 10 and represented at 30, or flat top housing surfaces, represented in FIG. 10 at 34. The cooperation between the structure of the left attachment leg 252 and the display top housing surfaces 30 and 34 can be clearly seen in the cross-sectional view of FIG. 10. While the structure represented in FIG. 10 is one presently preferred embodiment of the present invention, those skilled in the art will appreciate that many other structures similar to, or equivalent to, that presented in the figures may be utilized.

Referring again to FIG. 9, the right attachment leg 254 is provided with three circular bores 262A-262C on its vertical portion. Each of the circular bores is configured to receive a mounting post 204 as shown best in FIG. 11. The configuration of the mounting post 264 and the circular bore 262B is such that a tight frictional engagement is established therebetween but one which allows rotation of the mounting post 264 within the circular bore 262B.

Mounting post 266 is inserted into bore 224B provided in the side of document platen 220 to create a frictional engagement therebetween. As shown best in FIG. 11, mounting post 264 and mounting post 266 are each formed so that, when joined together by a pin 268, a hinge is formed. The resulting hinge structure allows the angle of orientation of the document platen 220 in relation to the face (not shown) of the display 28 to be varied. The rotation of the mounting post 264 within circular bore 262B also allows the document platen 220 to be rotated. Furthermore, the height at which the document platen 220 is held above the work surface may be adjusted by moving the mounting post 264 to another of the three circular bores 262A-262C.

As shown in FIG. 9, the document platen 220 is provided with a bore 224B and 224A on each of two of its sides. In FIG. 9 the third embodiment 250 is represented as being configured so that the document platen 220 is positioned on the right side of the display 28. If a user desires to position the document platen on the left side of the display 28, the document platen may be removed from the mounting post 266, the respective positions of the left attachment leg 252 and the right attachment leg 254 may be reversed and the mounting post 266 reinserted into bore 224A. In this way, an uncomplicated procedure allows the user to readily change between the document platen being mounted on the left or the right side of the display.

Also as represented in FIG. 9, the document platen 220 is provided with troughs 222A and 222B, one on each side of the document platen. Thus, when a user desires to mount the 24 document platen 220 on the opposite side of the display 28, but does not desire to disassemble the document platen 220 from the mounting post, the position of the entire embodiment 250 on the display 30 may be reversed and a trough is provided on the bottom of each side of the document platen 220 regardless of whether it is mounted on the left or the right of the display.

Also represented in FIG. 9 in association with document platen 220 is a copy clamp, generally designated 226, and a copy marker, generally designated 228, whose structure and operation will be explained shortly.

Figure 12:
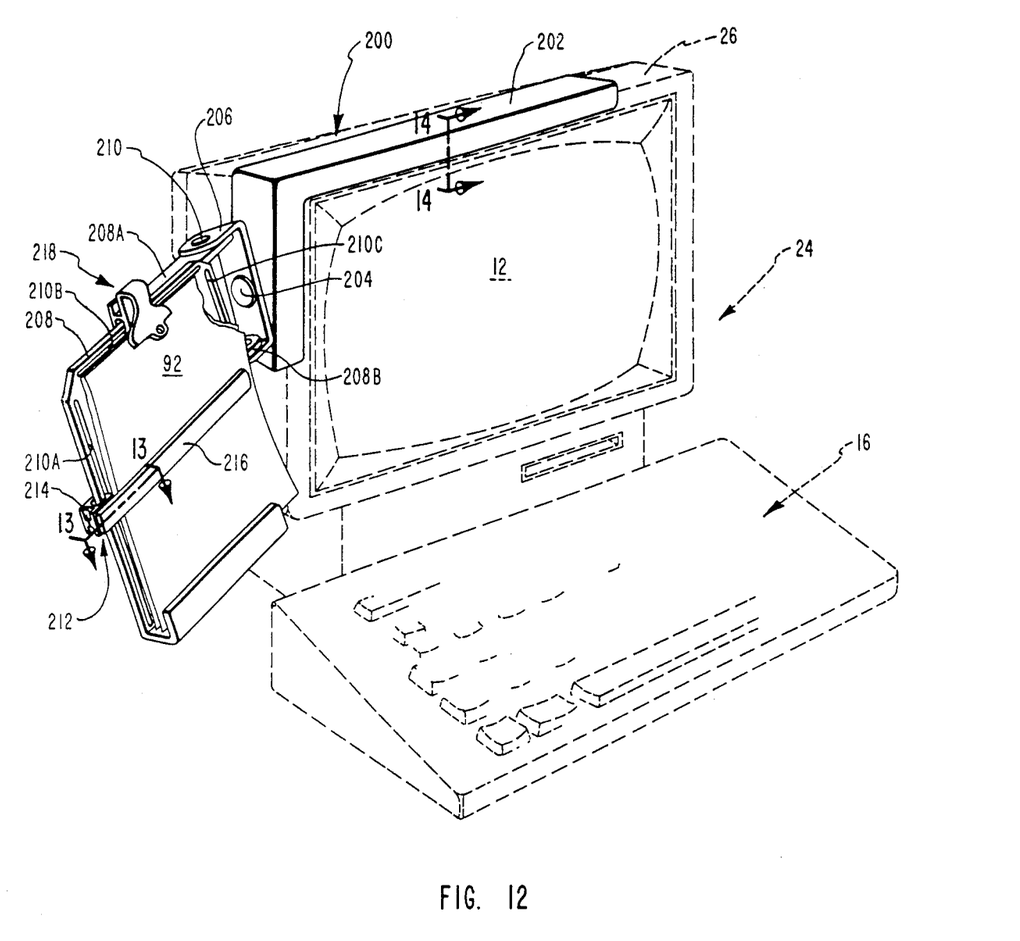
FIG. 12 is a perspective view of a fourth presently preferred embodiment of the present invention installed on another representative computer display.

A fourth presently preferred embodiment of the present invention is represented in FIG. 12 and is generally designated 200. The fourth presently preferred embodiment is illustrated in FIG. 12 as being installed on a display, generally designated 24, which includes a CRT 12 and which is enclosed within an integral housing with other computer hardware.

Figure 14:
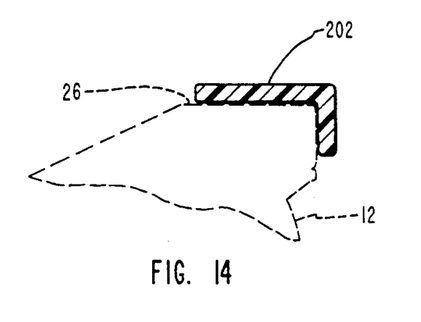
FIG. 14 is a cross-sectional view of the fourth preferred embodiment taken along line 14—14 of FIG. 12.

The fourth presently preferred embodiment is provided with only a single attachment leg 202. The general L-shape configuration of the attachment leg 202 can generally be seen in the cross-sectional view of FIG. 14. As can be further observed in FIG. 14 the attachment leg 202 rests upon the flat top surface 26 of the display 24.

It will be appreciated that attachment leg 202 is preferably fabricated from a heavy material so as to counterbalance the weight of documents placed on a document platen 208 in FIG. 12. Also, the length of the attachment arm 202, both the vertical and horizontal portions, could be extended to add greater stability to the fourth presently preferred embodiment 200.

Also represented in FIG. 12 is a U-bracket 206 which is rotatably attached to attachment leg 202 by bolt 204. Bolt 204 may be a rubber bolt as shown in FIG. 7 at 164. Attached to document platen 208 are arms 208A and 208B which are pivotally mounted to U-bracket 206 by way of bolts 210 in a fashion similar to that previously described or as known to those skilled in the art.

Figure 13A:
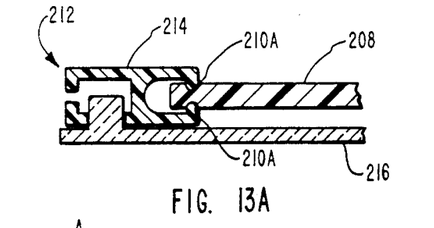
FIG. 13A and 13B are cross-sectional views of the fourth preferred embodiment taken along line 13—13 of FIG. 12.
Figure 13B:
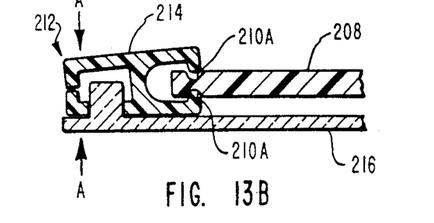

The document platen 208 is also provided with a copy clamp, generally designated 218, and a copy marker, generally designated 212. The copy clamp 218 and the copy marker 212 are similar in structure to the copy markers and copy clamps previously referenced herein and are secured to the perimeter of the document platen 208 by a structure best represented in FIGS. 13A and 13B. FIG. 13A is cross-sectional view of the copy marker 212 comprising a squeeze clamp 214 and a marker bar 216. As can be seen in FIGS. 12 and 13A-B, each side of the document platen 208 is provided with grooves 210A-210C around its perimeter. 21 As shown in FIG. 13A, the arms of the squeeze clamp 214 rest in the grooves 210A. When pressure is applied to the squeeze clamp 214, as indicated at arrows A in FIG. 13B, the squeeze clamp arms are disengaged from grooves 210A and the marker bar 216 can be repositioned. A similar squeeze structure is associated with the copy clamp 218. Providing appropriate grooves on each of the three perimeter sides of the document platen 208, allows one or more copy markers or copy clamps to be moved about as desired by the user.

Figure 15:
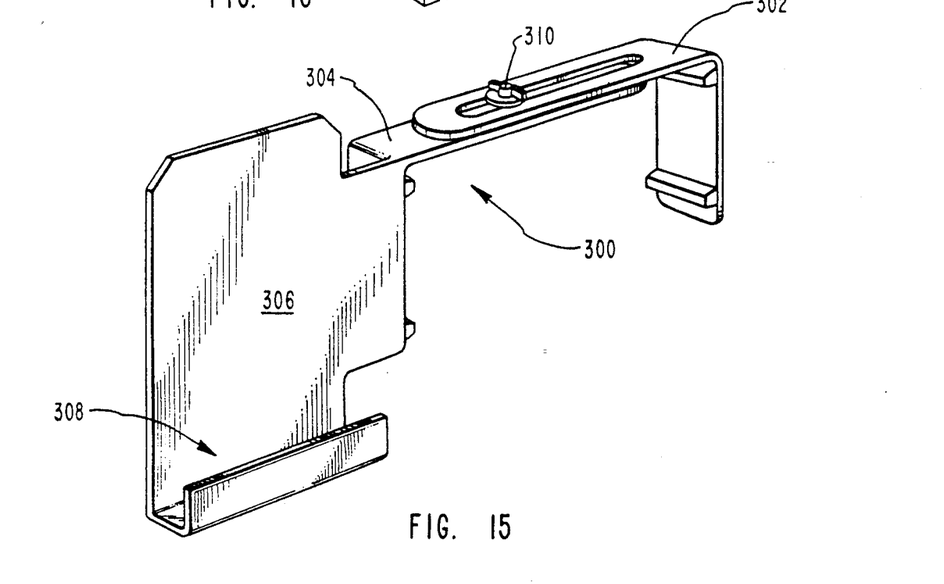
FIG. 15 is a perspective view of a fifth presently preferred embodiment of the present invention.
Figure 16:
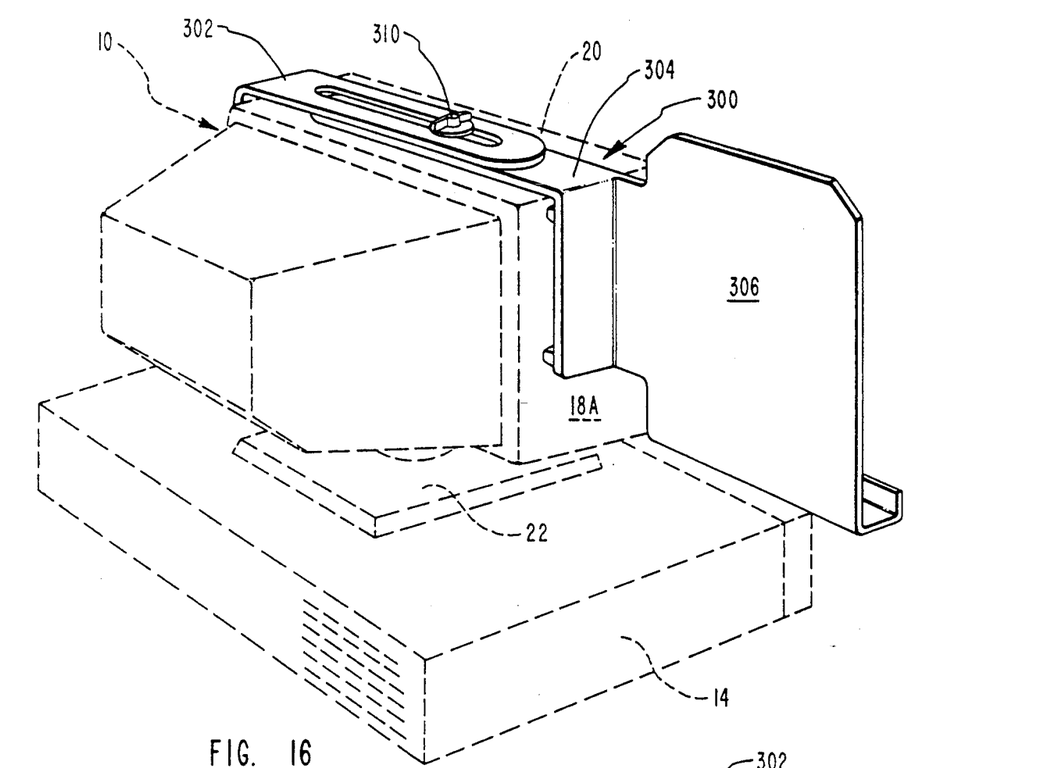
FIG. 16 is a reverse perspective view of the fifth embodiment installed on a representative computer display.

Referring now to FIG. 15, a fifth presently preferred embodiment is represented and generally designated 300. As represented in FIG. 15, the fifth representative embodiment includes a left attachment leg 302, a right attachment leg 304, and a wing nut 310 and bolt (not shown), arranged in a similar or identical fashion to that represented in FIGS. 1-3. The document platen 306 of the fifth embodiment is formed as a rigid, integral structure with the right attachment leg 304 and is also provided with a trough generally designated at 308. Forming the document platen 308 as an integral structure with one or both of the attachment legs allows the lowest cost fabrication of these structures. FIG. 16 shows the fifth embodiment in a reverse perspective view and installed upon a representative computer display 10.

As will now be appreciated, the present invention provides an apparatus for holding documents and other articles where they may be conveniently seen by a user, such as a typist, who is also viewing a display. Embodiments carrying out the present invention may be adjusted to allow use on a number of different displays each having a different housing configuration and without requiring modification to the display itself. Thus, embodiments of the present invention may be readily interchanged from display to display.

The present invention allows a user, whether merely viewing the display or operating a terminal and inputting information, to work more efficiently. Embodiments of the invention are adapted to hold documents and other articles in a position transversely adjacent to the face of a display so that minimal eye movement is required to look back and forth between the document or article and the display. Some embodiments of the invention also allow the position of the document to be adjusted.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for holding a document adjacent to a computer display which may be operated by a computer programmer, the computer display having substantially vertical sides, substantially horizontal sides, and a front panel, comprising:

attaching means for compressively gripping the computer display such that the positional relationship between said attaching means and the computer display remains fixed when force is applied thereto, said attaching means compressively gripping at least two opposing substantially vertical sides of the computer display;

holding means for holding a document in a configuration to allow viewing of the document, the holding means having peripheral edges; and securing means for securing the holding means to the attaching means such that the holding means is movably-positionable adjacent to the display in a position viewable by a user of the computer display, the securing means having at least two spaced apart braces, each one of the at least two braces being pivotally attached to the rear of the holding means between two of the opposing peripheral edges of the holding means so as to form a line of pivot at the attachment between the at least two braces and the holding means, each brace further being pivotally attached to the attaching means so as to provide separate lines of pivot at the attachment between the at least two braces and the attaching means, the first and separate lines of pivot being configured so as to provide for at least two degrees of planar movement by the holding means such that the holding means may be moved sideways and back and forth in a horizontal plane relative to the computer display and the computer programmer.

2. An apparatus for holding a document as defined in claim 1 wherein the attaching means comprises:
a first attachment leg;
a second attachment leg; and
locking means for locking the first and the second attachment legs in one of a plurality of positional relationships.

3. An apparatus for holding a document as defined in claim 2 wherein the first and second attachment legs each comprise a first portion adapted to grip the vertical side of a computer display and a second portion disposed at a substantially right angle to the first portion.

4. An apparatus for holding a document as defined in claim 2 wherein the first and second attachment legs comprise gripping members adapted to frictionally engage the outer surface of a computer display housing.

5. An apparatus for holding a document as defined in claim 2 wherein the first and second attachment legs comprise resilient ridges positioned on one side of the attachment legs.

6. An apparatus for holding a document as defined in claim 2 wherein the locking means comprises:
a longitudinal slot formed along a portion of the first attachment leg;
a bolt in contact with the second attachment leg, the bolt extending through the longitudinal slot; and
a nut threadably engaged to the bolt such that as the nut is tightened the first attachment leg and the second attachment leg are frictionally locked in a fixed relationship.

7. An apparatus for holding a document as defined in claim 1 wherein the holding means comprises a document platen.

8. An apparatus for holding a document as defined in claim 1 wherein the holding means comprises a copy marker.

9. An apparatus for holding a document as defined in claim 8 wherein the holding means further comprises grooves placed on the opposing surface of the holding means and wherein the copy marker comprises a squeeze clamp, said squeeze clamp comprising two arms, each of said arms being adapted to engage one of said grooves.

10. An apparatus for holding a document as defined in claim 9 wherein the holding means further comprises a copy clamp, said copy clamp comprising a squeeze clamp.

11. An apparatus for holding a document as defined in claim 1 wherein the securing means comprises:
at least one arm having first and second ends;
first means for securing the first end of the arm to the attaching means; and
second means for securing the second end of the arm to the holding means.

12. An apparatus for holding a document as defined in claim 11 wherein the first means comprises:
a bracket having a slot formed therein;
a bolt connected to the attaching means and extending through the slot; and
a nut threaded onto the bolt.

13. An apparatus for holding a document as defined in claim 1 wherein the securing means comprises means for adjusting the height of the holding means.

14. An apparatus for holding a document as defined in claim wherein the securing means comprises means for adjusting the position of the holding means in relation to the display.

15. An apparatus for holding a document as defined in claim 8 wherein the copy marker comprises a marker bar, said marker bar's length extending beyond the edge of the holding means such that the marker bar extends over a portion of the display.

16. An apparatus for holding a document as defined in claim 1 wherein the holding means comprises a first holding means for holding at least a first document and a second holding means for holding at least a second document and wherein the securing means comprises a first securing means for securing the first holding means to the attaching means and a second securing means for securing the second holding means to the attaching means.

17. An apparatus for holding a document as defined in claim 1 wherein the holding means is adapted to be placed in a substantially horizontal configuration and further adapted to hold three-dimensional objects.

18. An apparatus for holding a document as defined in claim 1, wherein the attachment between the at least two braces and the attaching means provides for horizontal and vertical degrees of pivot.

19. A display mounted document holder placed in relation to a computer display, the front of the display-mounted document holder defining a plane, comprising:
a clamp adapted for gripping the display, said clamp being adjustable to grip any one of a plurality of displays having different dimensions, said clamp is U-shaped in configuration thereby gripping at least two opposing sides of the display;

document platen having peripheral edges adapted for holding a document in a viewable configuration, said document platen placed adjacent the front of the display, said document platen being capable of being adjusted to at least one angle; and securing means for securing the document platen to the clamp, the securing means having at least two spaced apart braces, each one of the at least two braces being pivotally attached to the rear of the document platen between two of the opposing peripheral edges of the document platen so as to form a first line of pivot at the attachment between the at least two braces and the document platen, the at least two braces further being pivotally attached to the clamp so as to provide separate lines of pivot at the attachment between the at least two braces and the clamp, the first and separate lines of pivot being configured so as to provide for at least two degrees of planar movement by the document platen such that the document platen may be readily moved in all directions.

20. A display mounted document holder as defined in claim 19 wherein the clamp comprises:
a first attachment leg;
a second attachment leg; and
locking means for locking the first and the second attachment legs in one of a plurality of positional relationships.

21. A display mounted document holder as defined in claim 20 wherein the first and second attachment legs each comprise a first portion adapted to grip the vertical side of a computer display and a second portion disposed at a substantially right angle to the first portion.

22. A display mounted document holder as defined in claim 20 wherein the first and second attachment legs comprise resilient ridges attached to one side of the attachment legs.

23. A display mounted document holder as defined in claim 20 wherein the locking means comprises:
a longitudinal slot formed along a portion of the first attachment leg;
a bolt fixed to the second attachment leg, the bolt extending through the longitudinal slot; and
a nut threadably engaged to the bolt such that as the nut is tightened the first attachment leg and the second attachment leg are frictionally held in a fixed relationship.

24. A display mounted document holder as defined in claim 19 wherein the document platen comprises a copy marker and wherein the document platen further comprises grooves placed on the opposing surface of the document platen and wherein the copy marker comprises a squeeze clamp, said squeeze clamp comprising two arms, each of said arms being adapted to engage one of said grooves.

25. A display mounted document holder as defined in claim 19 wherein the securing means comprises:
at least one arm having first and second ends;
first means for securing the first end of the arm to the clamp; and
second means for securing the second end of the arm to the document platen.

26. A display mounted document holder as defined in claim 25 wherein the first means comprises:
a bracket having a slot formed therein;
a bolt connected to the attaching means and extending through the slot; and
a nut threaded onto the bolt.

27. A display mounted document holder as defined in claim 24 wherein the copy marker comprises a marker bar, said marker bar's length extending beyond the edge of the document platen such that the marker bar extends over at least a portion of the display.

28. A display mounted document holder as defined in claim 19 comprising a first document platen and a second document platen and wherein the securing means comprises a to the clamp and a second securing means for securing the second document platen to the clamp.

29. An apparatus for holding a document in any one of a plurality of positions elevated above a work surface and transversely adjacent to a computer display having substantially vertical sides, the apparatus comprising:
a first gripping member;
a second gripping member;
locking means for positioning the first gripping member and the second gripping member in a substantially parallel relationship and one of a plurality of distances apart such that the first gripping member frictionally engages a first side of the display and the second gripping member frictionally engages a second opposing side of the display;
a document platen having peripheral edges adapted for holding at least one document in a non-horizontal orientation; and
at least two support arms having a first end and a second end connecting the first gripping member and the document platen such that the document platen is held in a position transversely adjacent to the display and elevated above the work surface, the first end of the at least two support arms being pivotally attached to the rear of the document platen between two opposing peripheral edges of the document platen such that a first line of pivot is formed at the attachment between the at least two support arms and the document platen, the at last two support arms further being pivotally attached to the first gripping member so as to provide separate lines of pivot at the attachment between the at least two support arms and the first gripping member, the first and separate lines of pivot being configured so as to provide for at least two degrees of planar movement by the document platen such that the document platen may be readily moved in all directions.

30. An apparatus for holding a document as defined in claim 29 wherein the first and second gripping members each comprise members adapted to grip the vertical sides of the computer display.

31. An apparatus for holding a document as defined in claim 29 wherein the locking means comprises:
a longitudinal slot formed along a portion of the gripping member;
a bolt fixed to the gripping member, the bolt extending through the longitudinal slot; and
a nut threadably engaged to the bolt such that as the nut is tightened the first gripping member and the second gripping member are frictionally locked in a fixed relationship.

32. An apparatus for holding a document as defined in claim 29 further comprising a copy marker and wherein the document platen comprises grooves placed on the surface thereof and wherein the copy marker comprises:

a squeeze clamp, said squeeze clamp comprising two arms, each of said arms being adapted to engage one of said groove; and;

a marker bar, said marker bar's length extending beyond the edge of the document platen such that the marker bar extends over a portion of the display.

33. An apparatus for holding a document as defined in claim 29 comprising a first document platen and a second =21 document platen and a first support arm and a second support arm.

* * * * *